(12) United States Patent  (10) Patent No.: US 7,053,968 B2
Hong et al.  (45) Date of Patent: May 30, 2006

(54) LIQUID CRYSTAL DISPLAY DEVICE WITH TOUCH PANEL AND METHOD OF FABRICATING THE SAME

(75) Inventors: Hee Jung Hong, Seoul (KR); Hwan Seong Yu, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 93 days.

(21) Appl. No.: 10/743,139

(22) Filed: Dec. 23, 2003

(65) Prior Publication Data

US 2004/0223089 A1  Nov. 11, 2004

(30) Foreign Application Priority Data

Dec. 24, 2002  (KR) .................. 10-2002-0083399

(51) Int. Cl.
*G02F 1/133*  (2006.01)
*G09G 5/00*  (2006.01)
*G08C 21/00*  (2006.01)

(52) U.S. Cl. .................. 349/12; 349/122; 345/173; 178/18.08

(58) Field of Classification Search .................. 349/12, 349/58, 96, 122, 137, 138, 155, 156; 345/173, 345/174, 175, 179; 178/18.03, 18.05–18.09, 178/18.11, 19.01–19.04
See application file for complete search history.

(56) References Cited

U.S. PATENT DOCUMENTS

| 2004/0104899 A1* | 6/2004 | Hong et al. .................. 345/173 |
| 2004/0104900 A1* | 6/2004 | Bang et al. .................. 345/173 |
| 2004/0105040 A1* | 6/2004 | Oh et al. ...................... 349/12 |

FOREIGN PATENT DOCUMENTS

| JP | 60-222918 | 11/1985 |
| JP | 07-210294 | 8/1995 |
| KR | 1999-88395 | 12/1999 |
| KR | 2000-77327 | 12/2000 |
| KR | 1020000074205 | 12/2000 |

* cited by examiner

*Primary Examiner*—Toan Ton
*Assistant Examiner*—Tai Duong
(74) *Attorney, Agent, or Firm*—McKenna Long & Aldridge LLP

(57) ABSTRACT

A liquid crystal display device with a touch panel and a method of fabricating the same are disclosed in the present invetion. The liquid crystal dispel device with a touch panel includes a liquid crystal display device displaying a picture image, a digitizer detecting a position of a stylus pen and located below the liquid crystal display device, a passivation layer on an upper surface of the liquid crystal display device, and a top case securing both the liquid crystal display device and the passivation layer.

20 Claims, 7 Drawing Sheets

LIQUID CRYSTAL DISPLAY DEVICE WITH TOUCH PANEL AND METHOD OF FABRICATING THE SAME

This application claims the benefit of the Korean Patent Application No. P2002-083399 filed on Dec. 24, 2002, which is hereby incorporated by reference.

BACKGROUND OF THE INVENTION

1. Field of the Invention

The present invention relates to a liquid crystal display device, and more particularly, to a liquid crystal display device with a touch panel and a method of fabricating the same. Although the present invention is suitable for a wide scope of applications, it is particularly suitable for making a user comfortable in writing and providing a slim dimension of the liquid crystal display device.

2. Discussion of the Related Art

In general, a touch panel is mounted on a display device of a notebook computer, which serves as an input device for position information by a user without an additional keyboard or mouse. The touch panel has been used for a graphic process such as CAD. The touch panel is referred to as a touch screen, a digitizer, a tablet or an electric graphic input panel (EGIP).

Depending upon a sensing method when a user touches a display surface, touch panels are classified into a resistive type, a capacitive type, and an electromagnetic type. In the resistive type touch panel, a current change is detected according to the position of a touching point with applying a DC voltage. Meanwhile, in the capacitive type touch panel, the position of a touching point is detected by a capacitance coupling with applying an AC voltage. Also, in the electromagnetic type touch panel, the position of a touching point is detected by detecting a resonant frequency resonated as an induction voltage with applying an electromagnetic field.

The respective type touch panels have different signal-amplification, resolution, design and process technology characteristics, so that the type of the touch panel is selected by a purpose of a display device using the touch panel in considering economical efficiency and endurance as well as electro-optics, electrical, mechanical, environment-resisting, and input characteristics.

A resistive type touch panel according to the related art will be described with reference to the accompanying drawings. FIG. 1 is a cross-sectional view illustrating a resistive type touch panel according to the related art. As shown in FIG. 1, the resistive type touch panel according to the related art includes upper and lower substrates 1 and 2, transparent electrodes (not shown), and spacers 5. The transparent electrodes (not shown) having a predetermined resistance value are formed on opposing surfaces of the upper and lower substrates 1 and 2, and the spacers 5 are formed between the upper and lower substrates 1 and 2 for maintaining an interval therebetween. In this case, both upper and lower substrates 1 and 2 are formed of glass substrates, or the upper substrate 1 is formed of a polyethylene terephtalate (PET) layer, and the lower substrate 2 is formed of a glass substrate.

In the resistive type touch panel, when a portion of the upper substrate 1 is touched with a finger 3 or a pen 4 at a predetermined pressure, the transparent electrodes formed on the opposing surfaces of the upper and lower substrates are in contact with each other. As a result, a controller (not shown) reads a voltage value variable by a resistance value of a touching point, thereby detecting coordinates of the touching point.

Meanwhile, the electromagnetic type touch panel has lately attracted attention because it detects more accurate position of the touch point than the resistive type touch panel. The electromagnetic type touch panel includes a digitizer and a stylus pen. The digitizer includes two sets of array coils perpendicular to each other, and the stylus pen is used for hand-in of a predetermined position on the digitizer.

FIG. 2 is a cross-sectional view illustrating a related art electromagnetic type touch panel. As mentioned above, the related art electromagnetic type touch panel includes a digitizer and a stylus pen. Referring to FIG. 2, the digitizer includes a sensor board 6, a shield plate 8, an adhesive 9, and a digitizer board 11. The digitizer generates an electromagnetic field, applies the electromagnetic field to a stylus pen 7, and receives an electromagnetic wave resonated at a touching point of the stylus pen 7, thereby detecting the touching point of the stylus pen 7. The shield plate 8 is formed of a metal material below the sensor board 6 for excluding the electromagnetic wave generated from the sensor board 6. Also, the shield plate 8 is attached to the sensor board 6 by the adhesive 9, and the digitizer board 11 is connected to the sensor board 6 by a connector 10 for driving the sensor board 6. Although not shown, the sensor board 6 includes a plurality of X-axis and Y-axis coils having loop-shaped structures for generating an electromagnetic field by receiving a current from a power source. The digitizer board 11 includes a circuit (not shown) for driving the sensor board 6, and a plurality of ICs 11a.

The stylus pen 7 for inputting position information on the sensor board 6 includes a coil 12 and a capacitor 13. The coil 12 generates a current by receiving the electromagnetic field from the sensor board 6, and then generates an electromagnetic wave by the receiving the current. Also, the capacitor 13 charges and discharged the current generated in the coil 12. Accordingly, the electromagnetic type touch panel detects the position of the stylus pen 7 by using the electromagnetic of the stylus pen 7 and the sensor board 6, so that the direct detection of the stylus pen 7 is obtained. As a result, a user can perform fine and elaborate work on the electromagnetic type touch panel by controlling the thickness and the strength of color.

The electromagnetic type touch panel will be explained in more detail as follows. FIG. 3 is a circuit diagram schematically illustrating the sensor board and the stylus pen in the related art electromagnetic type touch panel. Referring to FIG. 3, the sensor board 6 of the electromagnetic type touch panel sequentially inputs AC voltages 16 to the plurality of loop patterns 15 connected to one ground terminal 14, so that the electromagnetic field is generated in the loop patterns 15. In other words, the loop pattern 15 and the stylus pen 7 respectively generate a loop-shaped solenoid. Thus, in case the current flows to the loop pattern 15, the electromagnetic field is generated at the direction perpendicular to the loop pattern 15.

Also, the stylus pen 7 is resonated with the electromagnetic field, so that the stylus pen 7 holds the resonant frequency for a predetermined time period, and then discharges the resonant frequency. In other words, the resonant frequency is stored in the capacitor 13 of the stylus pen 7 instantaneously, and discharged. Then, the discharged current from the stylus pen 7 generates the electromagnetic field by the loop pattern 15, thereby generating the loop current in the loop pattern 15. Subsequently, the sensor board 6 receives the electromagnetic field output from the stylus pen 7, and then switches a terminal to which the AC power source 16 is applied. As a result, the electromagnetic wave received in the sensor board 6 is changed to a voltage value, and then a controller (not shown) reads the changed voltage value, thereby detecting the coordinates of the stylus pen.

FIG. 4 illustrates an electromagnetic wave between the sensor and the stylus pen in the related art electromagnetic type touch panel. Referring to FIG. 4, an electromagnetic induction between the loop pattern 15 and the stylus pen 7 in the sensor board 6 is repetitively performed in a short time, so that movement of the stylus pen 7 on the sensor board 6 can be detected. Arrows 18 of the drawing indicate the direction of the electromagnetic field. Also, a signal intensity of the stylus pen 7 detected through the loop pattern 15 will be described with reference to FIG. 5. A step-shaped signal 19 corresponds to each loop pattern (15 of FIG. 3), and the peak of the step-shaped signal 19 corresponds to the position of the stylus pen 7. As a result, the electromagnetic type touch panel detects the correct position of the stylus pen 7 by using the electromagnetic induction of the loop pattern 15 of the sensor board 6 and the stylus pen 7.

FIG. 6 is a cross-sectional view illustrating the related art LCD panel. As shown in FIG. 6, the related art LCD panel includes a lower substrate 27, an upper substrate 28, a liquid crystal layer 32, and a ball spacer 33. The lower substrate 27 includes a pixel electrode 25 to which a video signal voltage is applied by switching a thin film transistor T. The thin film transistor T includes a gate electrode 20, a gate insulating layer 21, a semiconductor layer 22, and source/drain electrodes 23a and 23b. Also, the upper substrate includes a black matrix layer 29 for blocking out light from portions except for the pixel electrode 25, a color filter layer 30 for displaying R/G/B color, and a common electrode 31. The liquid crystal layer 32 is formed between the upper and lower substrates, and the ball spacer 33 is formed to maintain a constant interval between the upper and lower substrates. First and second polarizing plates (not shown) are formed on the external surfaces of the upper and lower substrates 27 and 28 for polarizing the light, and a backlight is formed below the lower substrate 27 for irradiating the light to the LCD panel.

A schematic corss-sectional view of the related art electromagnetic type touch panel attached to the LCD device will be described with reference to FIG. 7. FIG. 7 illustrates an LCD device integrated with a related art electromagnetic type touch panel. As shown in FIG. 7, the LCD device 40 includes an LCD panel 43, first and second polarizing plates 43a and 43b, a backlight 44, and a case top 41. The first and second polarizing plates 43a and 43b are respectively formed on the external surfaces of the upper and lower substrates of the LCD panel 43, and the backlight 44 is formed below the LCD panel 43 for irradiating the light to the LCD panel. Also, the case top 41 is formed to connect the LCD panel 43 having the first and second polarizing plates 43a and 43b to the backlight 44.

Furthermore, the LCD device includes a sensor board 6, a shield plate 8, and a digitizer board 11. The sensor board 6, the shield plate 8, and the digitizer board 11 are sequentially positioned below the LCD device 40. The sensor board 6 generates an electromagnetic wave, and detects the position of a stylus pen by detecting the electromagnetic wave from the stylus pen 7. Also, the shield plate 8 is formed for excluding the electromagnetic wave generated from the sensor board 6. The digitizer board 11 is formed below the shield plate 8, and is connected to the sensor board 6 by a connector 10 for driving the sensor board 6. With this configuration, a driving circuit 45 is positioned below the shield plate 8 for driving the LCD panel 43.

Next, a passivation substrate 42 is formed in parallel with the LCD device 40 for protecting the LCD device 40, and attached to the top case 41 by an adhesive. Accordingly, when the stylus pen 7 is positioned on the upper surface of the passivation substrate 42, the position of the stylus pen 7 is detected by the electromagnetic field induction between the stylus pen 7 and the sensor board 6. In this case, the ball spacer (the reference numeral 33 of FIG. 6) is used for maintaining a cell gap between the upper and lower substrates of the LCD device 40. That is, in case of a direct contact between the stylus pen and the LCD device 40, the ball spacer 33 may be moved between the upper and lower substrates by a pressure, thereby generating ripples in the liquid crystal. As a result, the LCD device may be deteriorated. In this respect, it is required to maintain a predetermined distance d between the LCD device 40 and the passivation substrate 42. For this, a bezel 46 is formed in the circumference of the passivation substrate 42 for securing the passivation substrate 42 to the LCD device. The passivation substrate 42 is formed of a glass substrate.

However, the LCD device integrated with the electromagnetic type touch panel according to the related art has the following disadvantages.

In case of mounting the related art electromagnetic type touch panel to the LCD device by using the stylus pen, the stylus pen may slide on the surface of the passivation substrate since the passivation substrate is formed of a glass substrate, and the tip of the stylus pen is formed of a plastic material such as polyacetal, so that it is hard to make a user comfortable in writing. Also, it is required to maintain a uniform cell gap between the LCD device and the passivation substrate, so that the visual difference may cause picture images of the stylus pen and the LCD device. That is, the pointing position of the stylus pen may be different from the pointing position recognized by the user.

In case of mounting the related art electromagnetic type touch panel to the LCD device, a predetermined distance is maintained between the passivation substrate and the LCD device, and the passivation substrate is formed of a glass substrate, so that the total thickness and the weight of the LCD device are increased, thereby lowering a mobility.

SUMMARY OF THE INVENTION

Accordingly, the present invention is directed to a liquid crystal display device with a touch panel and a method of fabricating the same that substantially obviate one or more of problems due to limitations and disadvantages of the related art.

Another object of the present invention is to provide a liquid crystal display device with a touch panel and a method of fabricating the same making a user comfortable in writing and providing a slim dimension of the liquid crystal display device.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device with a touch panel includes a liquid crystal display device displaying a picture image, a digitizer detecting a position of a stylus pen and located below the liquid crystal display device, a passivation layer on an upper surface of the liquid crystal display device, and a top case securing both the liquid crystal display device and the passivation layer.

Herein, the liquid crystal display device includes a liquid crystal display panel having first and second substrates having a cell gap therebetween maintained by spacers, and a liquid crystal between the first and second substrates, first and second polarizing plates on external surfaces of the first and second substrates, respectively, and a backlight irradiating light to the liquid crystal display panel.

Also, the spacers are patterned spacers attached to one of the first substrate and the second substrate.

The liquid crystal display device with the touch panel further includes a top case securing the liquid crystal display panel, the first and second polarizing plates, the backlight, and the passivation layer to one another.

The liquid crystal display device with the touch panel further includes a driving circuit below the digitizer for driving the liquid crystal display panel.

Also, the passivation layer is formed on the first polarizing plate.

Also, the passivation layer is formed of a polyethylene terephtalate layer.

The polyethylene terephtalate layer is processed with an antiglare treatment.

The passivation layer is processed with a hard-coating layer.

Herein, the digitizer includes a sensor board generating an electromagnetic wave and detecting the electromagnetic wave from the stylus pen to detect a position of the stylus pen and located below the liquid crystal display device, a shield plate preventing the electromagnetic wave generated from the sensor and located below the sensor board, and a digitizer board driving the sensor and located below the shield plate.

In another aspect of the present invention, a method of fabricating a liquid crystal display device with a touch panel includes forming a liquid crystal display device displaying a picture image, forming a digitizer detecting a position of a stylus pen and located below the liquid crystal display device, forming a passivation layer on an upper surface of the liquid crystal display device, and forming a top case securing both the liquid crystal display device and the passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

An LCD device with a touch panel according to the present invention will be described with reference to the accompanying drawings.

Figure 1:
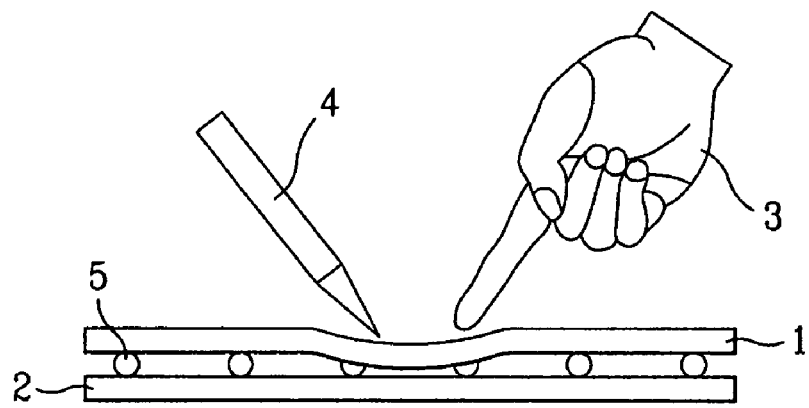
FIG. 1 is a cross-sectional view illustrating a related art resistive type touch panel.
Figure 2:
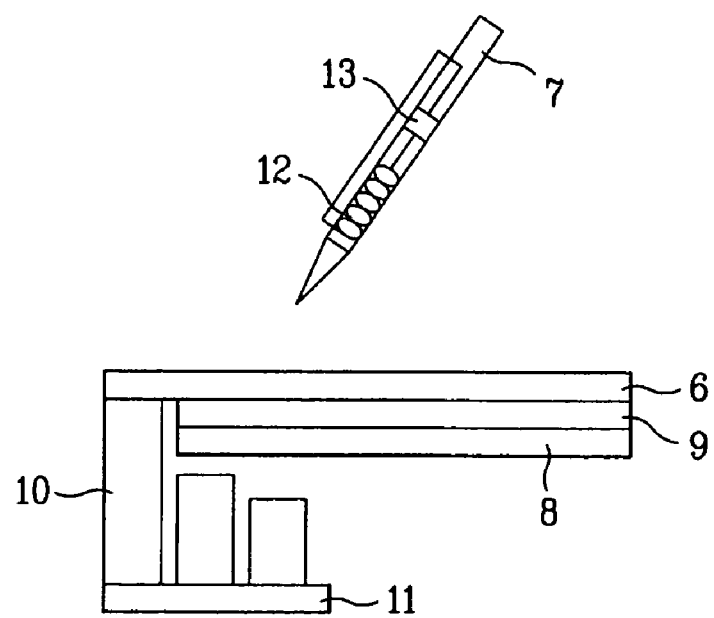
FIG. 2 is a cross-sectional view illustrating a related art electromagnetic type touch panel.
Figure 3:
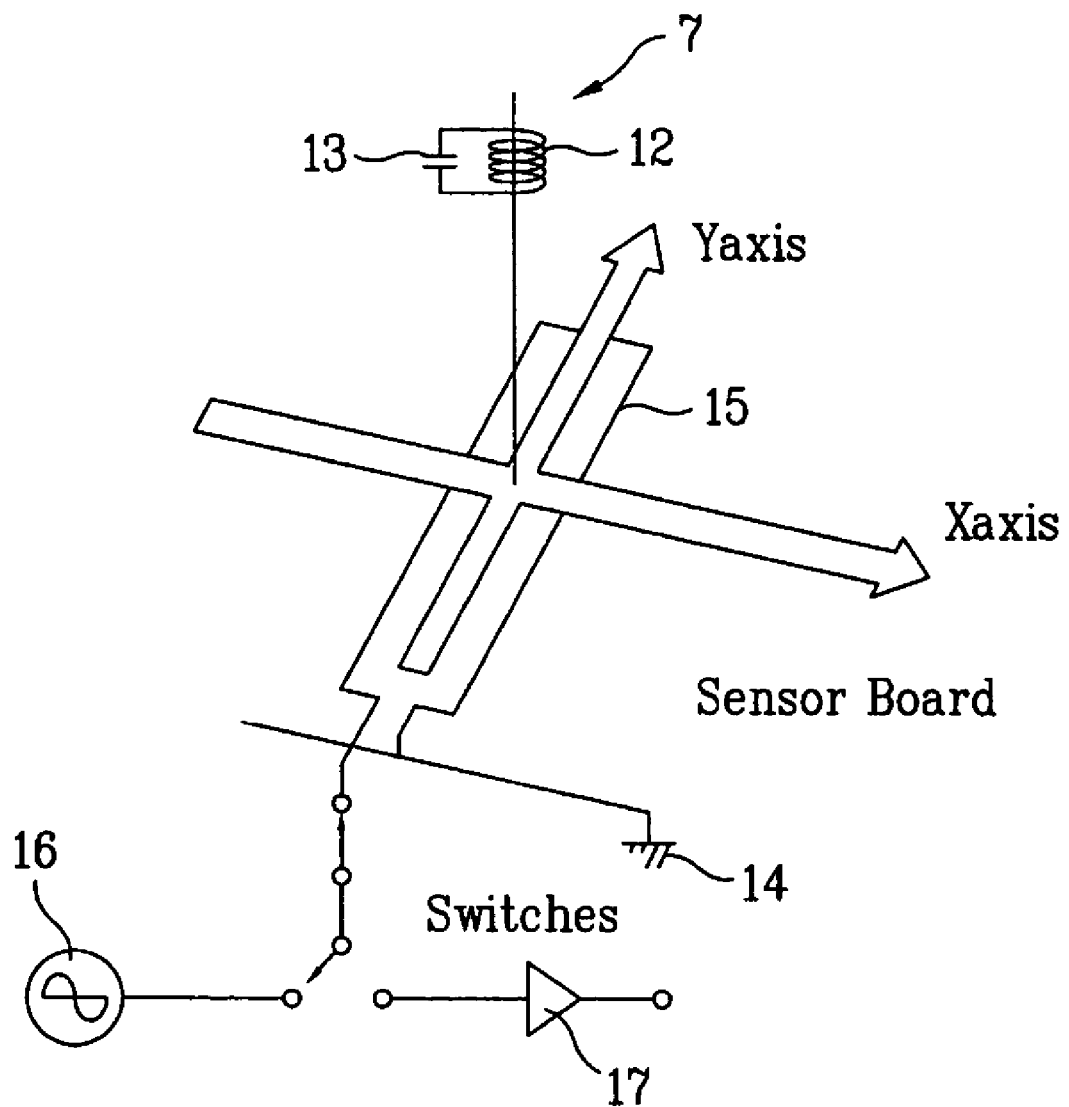
FIG. 3 is a circuit diagram schematically illustrating a sensor board and a stylus pen in the related art electromagnetic type touch panel.
Figure 4:
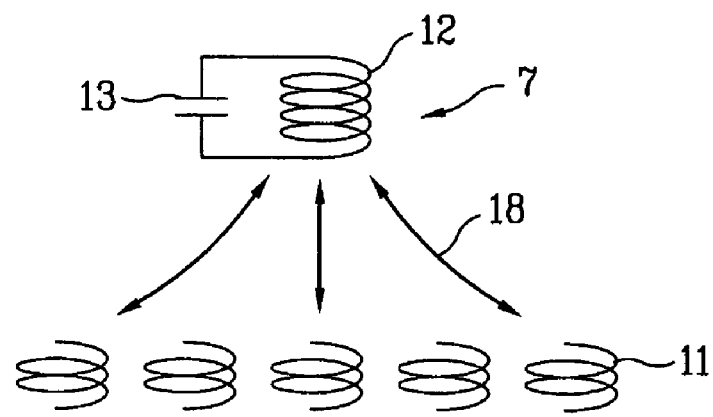
FIG. 4 illustrates an electromagnetic wave between a sensor board and a stylus pen in the related art electromagnetic type touch panel.
Figure 5:
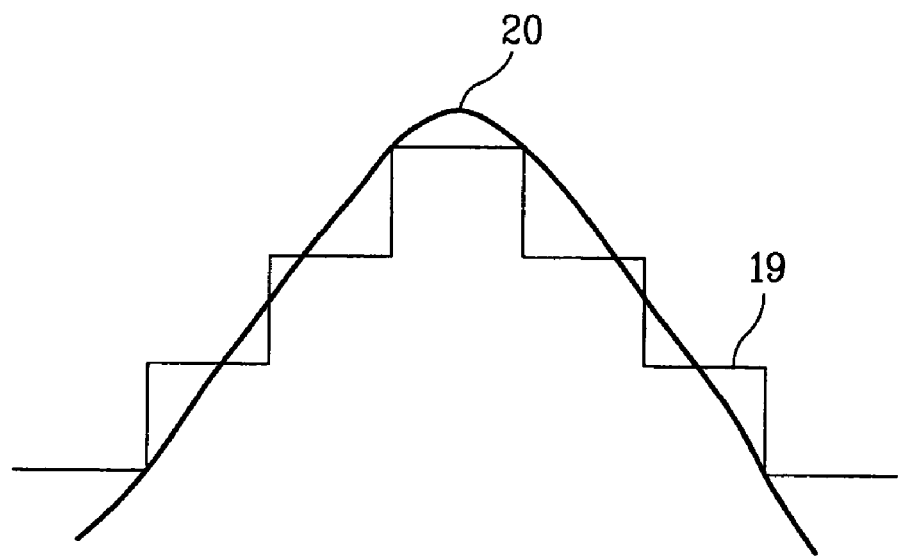
FIG. 5 illustrates a signal intensity of a stylus pen detected in the sensor board of the related art electromagnetic type touch panel.
Figure 6:
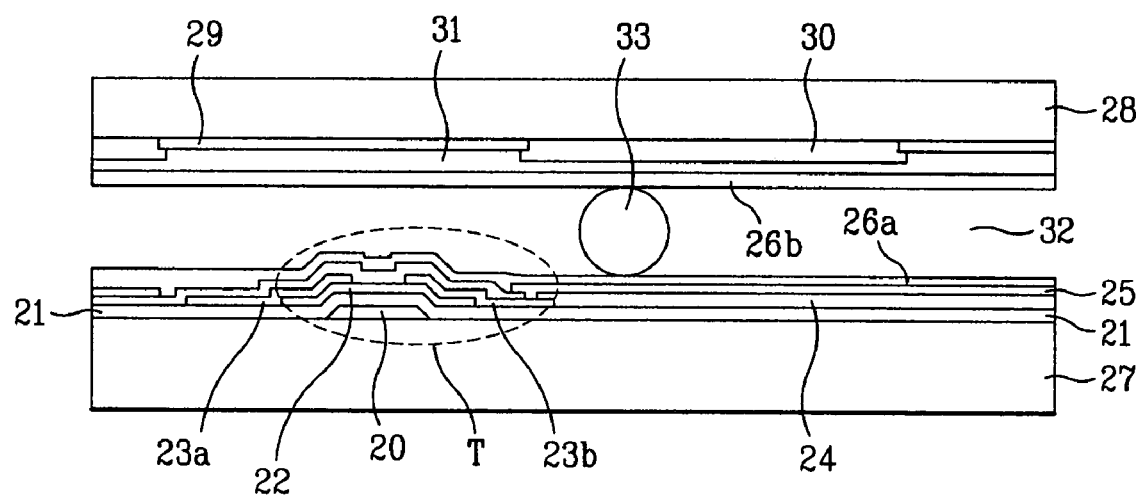
FIG. 6 is a cross-sectional view illustrating a related art LCD panel.
Figure 7:
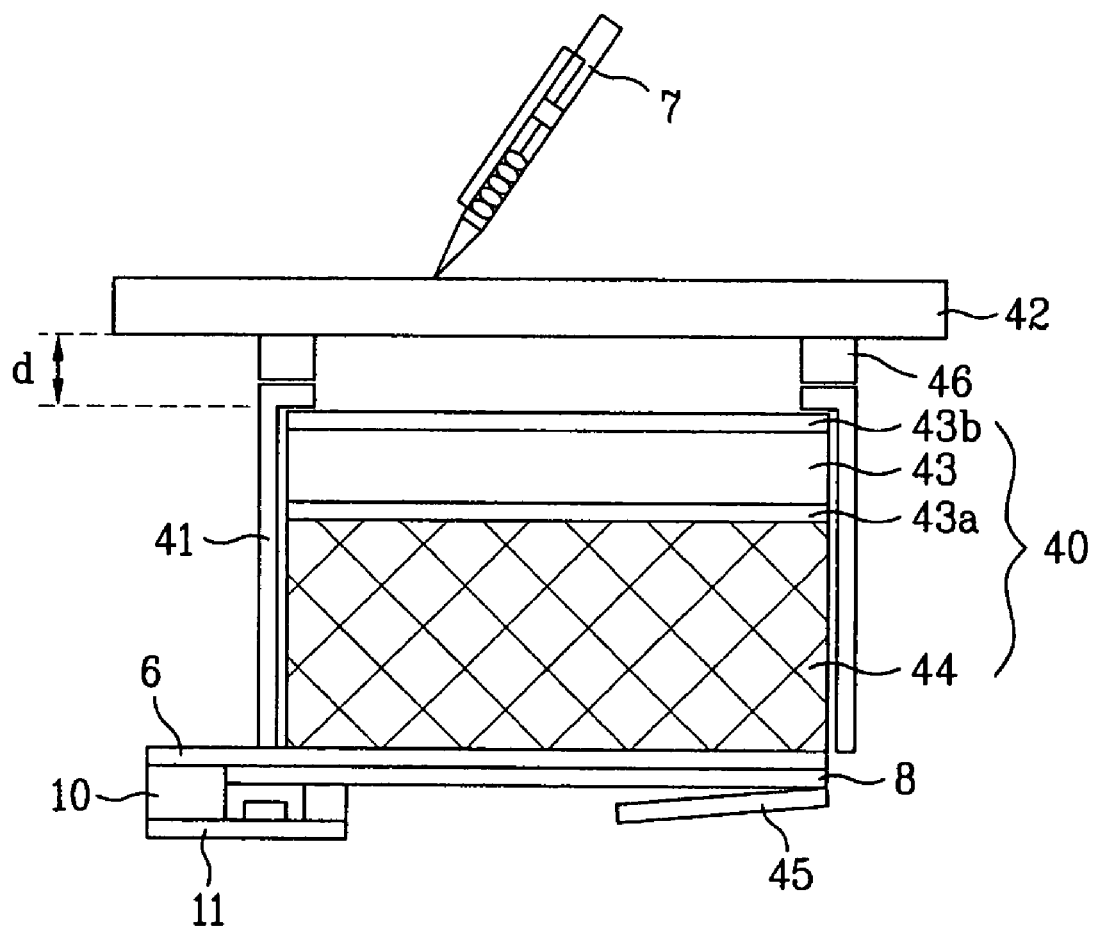
FIG. 7 is a cross-sectional view illustrating an LCD device integrated with the related art electromagnetic type touch panel.
Figure 8:
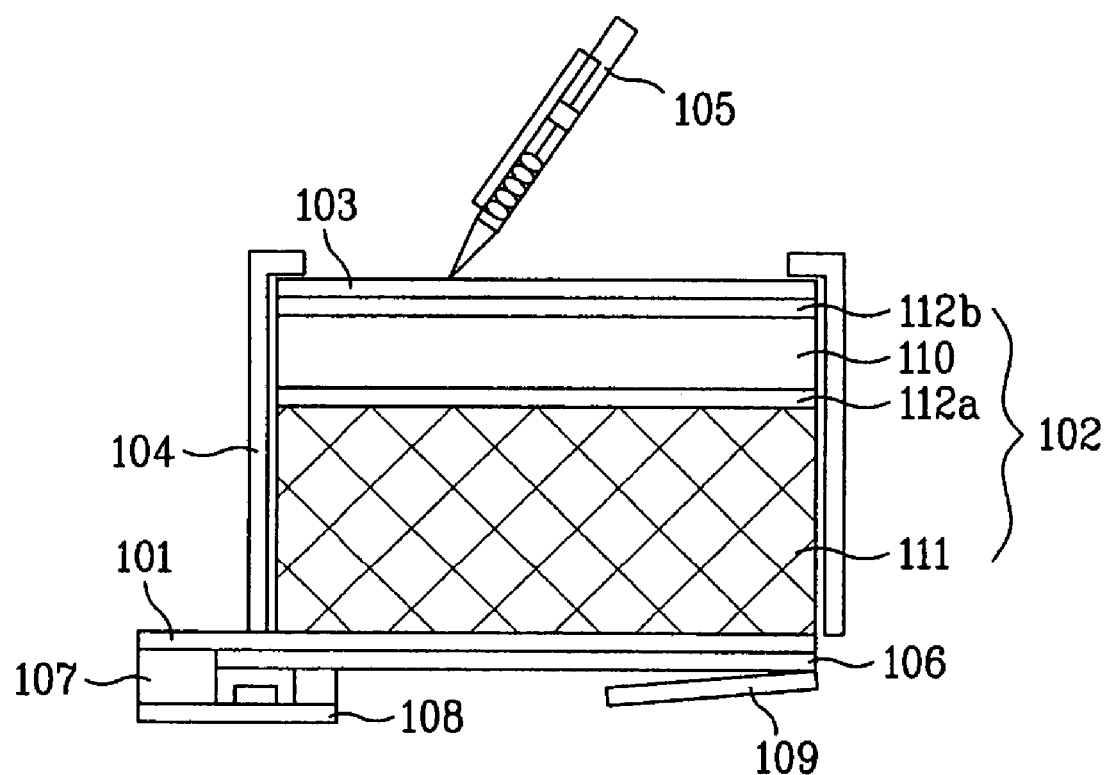
FIG. 8 is a cross-sectional view illustrating an LCD device integrated with an electromagnetic type touch panel according to the present invention.

FIG. 8 is a cross-sectional view illustrating an LCD device with an electromagnetic type touch panel according to the present invention. As shown in FIG. 8, the LCD device 102 includes an LCD panel 110, first and second polarizing plates 112a and 112b, and a backlight 111. At this time, the LCD panel 110 includes upper and lower substrates, and liquid crystal injected between the upper and lower substrates, for displaying a picture image. Also, the first polarizing plate 112a is formed on the upper surface of the LCD panel 110, and the second polarizing plate 112b is formed on the lower surface of the LCD panel 110. The backlight 111 is formed below the LCD panel 110 for irradiating light to the LCD panel 110. In addition, a passivation layer 103 is formed on the second polarizing plate 112b for protecting the LCD panel 110, and a top case 104 is to enclose and secure the LCD panel 110 having the passivation layer 103 and the first and second polarizing plates 112a and 112b to the backlight 111.

Furthermore, the LCD device includes a sensor board 101, a shield plate 106, and a digitizer board 108. That is, the sensor board 101, the shield plate 106, and the digitizer board 108 are sequentially positioned below the LCD device 102. The sensor board 101 generates an electromagnetic wave, and detects the electromagnetic wave from a stylus pen 105 to detect a position of the stylus pen 105. Also, the shield plate 106 is formed for preventing the electromagnetic wave generated from the sensor board 101. The digitizer board 108 is formed below the shield plate 106, and is connected to the sensor board 101 by a connector 107 for driving the sensor board 101. With such a configuration, a driving circuit 109 is positioned below the shield plate 106 for driving the LCD panel 110, and the stylus pen 105 is positioned on the passivation layer 103 for inputting the position information.

The passivation layer 103 is formed of a polyethylene terephtalate (PET) layer, and the mechanical and tensile strength of the upper substrate of the LCD panel 110 is increased. Thus, it protects the upper substrate and prevents the stylus pen 105 from sliding on the upper surface of the LCD panel 110 when the tip of the stylus pen 105 is touched on the upper surface of the upper substrate of the LCD panel, so that it makes a user comfortable in writing. Then, an antiglare treatment is performed to the PET passivation layer 103 to decrease reflectivity, and a hard-coating treatment is performed to prevent scratches on the upper surface of the LCD panel caused by the tip of the stylus pen 105. In the LCD device integrated with the touch panel according to the present invention, the passivation layer 103 is formed directly on the second polarizing plate 112b of the LCD device without a gap therebetween; so that it protects the upper surface of the LCD panel 110, and improves the mechanical strength, thereby obtaining slim dimension and light weight. Also, a visual difference is decreased between the picture images of the stylus pen 105 and the LCD panel 110.

If ball spacers for maintaining a interval between upper and lower substrates are used for the LCD panel 110 according to the present invention, the ball spacers may move between the upper and lower substrates by the contact of the stylus pen 105 in that the passivation layer 103 is in direct contact with the LCD panel 110, thereby generating ripples in the liquid crystal. Instead of the ball spacers, patterned-spacers may be used and fixed at one portion of the LCD panel for maintaining a cell gap between the upper and lower substrates. Thus, the LCD panel according to the present invention is manufactured in a different way from the related art.

Figure 9:
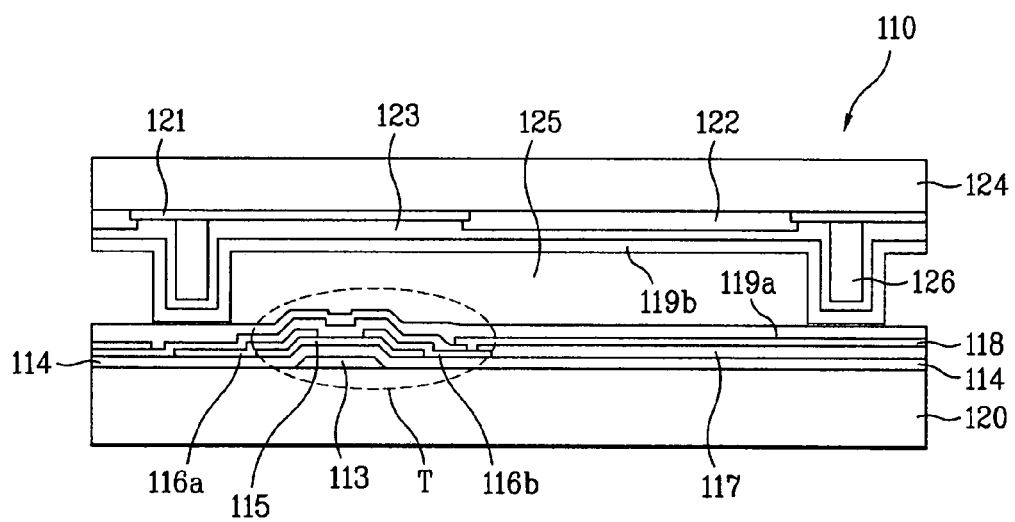
FIG. 9 is a cross-sectional view schematically illustrating an LCD panel according to the present invention.

FIG. 9 is a cross-sectional view illustrating an LCD panel according to the present invention. As shown in FIG. 9, the LCD panel 110 includes a lower substrate 120, an upper substrate 124, a liquid crystal layer 125, and patterned spacers 126. The lower substrate 120 includes a pixel electrode 118, to which a video signal voltage is applied by switching a thin film transistor T which includes a gate electrode 113, a gate insulating layer 114, a semiconductor layer 115, and source/drain electrodes 116a and 116b. Also, the upper substrate 124 includes a black matrix layer 121 for blocking out the light from portions except for the pixel electrode, a color filter layer 122 for displaying R/G/B color, and a common electrode 123. The liquid crystal layer 125 is formed between the upper and lower substrates, and the patterned spacers 126 are formed on the upper substrate for maintaining a cell gap between the upper and lower substrates.

The patterned spacers 126 are attached to the upper substrate 124 for maintaining a cell gap between the upper and lower substrates 120 and 124 not to be affected by the external pressure. For example, the patterned spacers 126 may be formed on the black matrix layer. Thus, when touching the upper surface of the LCD panel 110 with the stylus pen 105, the patterned spacers 126 do not move, so that it maintains a cell gap between the upper and lower substrates uniformly, and prevents ripples in the liquid crystal. Herein, the patterned spacers 126 are formed in the method of depositing a transparent acryl material on the upper substrate, and selectively removing the transparent acryl material by photolithography.

As mentioned above, the LCD device integrated with the touch panel according to the present invention has the following advantages.

The LCD device integrated with the touch panel according to the present invention is used with an LCD device having patterned spacers, thereby minimizing ripples in the liquid crystal when the LCD device is touched with a stylus pen.

In the LCD device integrated with the touch panel according to the present invention, a polyethylene terephtalate layer is formed on the LCD device, thereby making a user comfortable in writing and providing a slim dimension in the LCD device.

Also, in the LCD device integrated with the touch panel according to the present invention, a contact distance is minimized between a stylus pen and the liquid crystal, thereby decreasing a visual difference.

It will be apparent to those skilled in the art that various modifications and variations can be made in the liquid crystal display device with a touch panel and a method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device with a touch panel, comprising:
   a liquid crystal display device displaying a picture image;
   a digitizer detecting a position of a stylus pen and located below the liquid crystal display device;
   a passivation layer on an upper surface of the liquid crystal display device; and
   a top case securing both the liquid crystal display device and the passivation layer.

2. The liquid crystal display device with the touch panel of claim 1, wherein the liquid crystal display device comprises:
   a liquid crystal display panel having first and second substrates having a cell gap therebetween maintained by spacers, and a liquid crystal between the first and second substrates;
   first and second polarizing plates on external surfaces of the first and second substrates, respectively; and
   a backlight irradiating light to the liquid crystal display panel.

3. The liquid crystal display device with the touch panel of claim 2, wherein the spacers are patterned spacers attached to one of the first substrate and the second substrate.

4. The liquid crystal display device with the touch panel of claim 2, further comprising a top case securing the liquid crystal display panel, the first and second polarizing plates, the backlight, and the passivation layer to one another.

5. The liquid crystal display device with the touch panel of claim 2, further comprising a driving circuit below the digitizer for driving the liquid crystal display panel.

6. The liquid crystal display device with the touch panel of claim 2, wherein the passivation layer is formed on the first polarizing plate.

7. The liquid crystal display device with the touch panel of claim 1, wherein the passivation layer is formed of a polyethylene terephtalate layer.

8. The liquid crystal display device with the touch panel of claim 7, wherein the polyethylene terephtalate layer is processed with an antiglare treatment.

9. The liquid crystal display device with the touch panel of claim 1, wherein the passivation layer is processed with a hard-coating treatment.

10. The liquid crystal display device with the touch panel of claim 1, wherein the digitizer comprises:
    a sensor board generating an electromagnetic wave and detecting the electromagnetic wave from the stylus pen to detect a position of the stylus pen and located below the liquid crystal display device;

a shield plate preventing the electromagnetic wave generated from the sensor and located below the sensor board; and a digitizer board driving the sensor and located below the shield plate.

11. A method of fabricating a liquid crystal display device with a touch panel, comprising:

forming a liquid crystal display device displaying a picture image;

forming a digitizer detecting a position of a stylus pen and located below the liquid crystal display device;

forming a passivation layer on an upper surface of the liquid crystal display device; and forming a top case securing both the liquid crystal display device and the passivation layer.

12. The method of claim 11, wherein the liquid crystal display device comprises:

a liquid crystal display panel having first and second substrates having a cell gap therebetween maintained by spacers, and a liquid crystal between the first and second substrates;

first and second polarizing plates on external surfaces of the first and second substrates, respectively; and a backlight irradiating light to the liquid crystal display panel.

13. The method of claim 12, wherein the spacers are patterned spacers attached to one of the first substrate and the second substrate.

14. The method of claim 12, further comprising forming a top case securing the liquid crystal display panel, the first and second polarizing plates, the backlight, and the passivation layer to one another.

15. The method of claim 12, further comprising forming a driving circuit below the digitizer for driving the liquid crystal display panel.

16. The method of claim 12, wherein the passivation layer is formed on the first polarizing plate.

17. The method of claim 11, wherein the passivation layer is formed of a polyethylene terephtalate layer.

18. The method of claim 17, wherein the polyethylene tereplitalate layer is processed with an antiglare treatment.

19. The method of claim 11, wherein the passivation layer is processed with a hard-coating treatment.

20. The method of claim 11, wherein the digitizer comprises:

a sensor board generating an electromagnetic wave and detecting the electromagnetic wave from the stylus pen to detect a position of the stylus pen and located below the liquid crystal display device;

a shield plate preventing the electromagnetic wave generated from the sensor and located below the sensor board; and a digitizer board driving the sensor and located below the shield plate.

* * * * *